United States Patent [19]
Goetze et al.

[11] 3,710,439
[45] Jan. 16, 1973

[54] PRODUCTION OF 2-MERCAPTOETHANOL

[75] Inventors: Walter Goetze, Ludwigshafen; Werner Kasper, Frankenthal; Gerhard Klatt; Gerhard Schulz, both of Ludwigshafen, all of Germany

[73] Assignee: Badische Anilin - & Soda - Fabrik Aktiengesellschaft, Ludwigshafen/Rhine, Land Rhineland-Pfatz, Germany

[22] Filed: March 20, 1970

[21] Appl. No.: 21,534

[52] U.S. Cl. ................................260/609 R
[51] Int. Cl. ................................C07c 149/18
[58] Field of Search ......................260/609 A

[56] References Cited

UNITED STATES PATENTS 3,574,768  4/1971  Tompkins....................260/609 A

FOREIGN PATENTS OR APPLICATIONS 1,221,217  7/1966  Germany....................260/609 A
585,655    2/1947  Great Britain..............260/609 A

*Primary Examiner*—Lewis Gotts
*Assistant Examiner*—Delbert R. Phillips
*Attorney*—Johnston, Root, O'Keeffe, Keil, Thompson & Shurtleff

[57] ABSTRACT

Production of 2-mercaptoethanol by reaction of ethylene oxide with hydrogen sulfide in a molar ratio of about 1:1 in the presence of bis-($\beta$-hydroxyethyl) thioether as solvent at elevated temperature under superatmospheric pressure in homogeneous phase. 2-mercaptoethanol is used for the production of insecticides.

4 Claims, No Drawings

PRODUCTION OF 2-MERCAPTOETHANOL

This invention relates to an improved process for the production of 2-mercaptoethanol by reaction of ethylene oxide with hydrogen sulfide in the presence of bis-(β-hydroxyethyl) thioether.

It is known from U.K. Pat. No. 585,655 that 2-mercaptoethanol is obtained by reaction of gaseous ethylene oxide with hydrogen sulfide in the presence of bis-(β-hydroxyethyl)-thioether, the hydrogen sulfide being used in an excess of at least 100 percent. This method has the disadvantage that the excess hydrogen sulfide has to be recycled. Furthermore it is disclosed in U.K. Pat. No. 988,135 that 2-mercaptoethanol is obtained by reaction of gaseous ethylene oxide and hydrogen sulfide in a molar ratio of 2:1 in the presence of a cation exchanger. Like all methods carried out in the gas phase, this method has the disadvantage that a large reaction volume is required. Another disadvantage is that the effectiveness of the cation exchanger resin is impaired by polymerization products of ethylene oxide. According to another method (known from German Pat. No. 1,221,217) gaseous ethylene oxide is passed with an equivalent amount of hydrogen sulfide at a temperature of from 38° to 42°C into bis-(β-hydroxyethyl) thioether while a reaction mixture is continuously withdrawn in which the concentration of 2-mercaptoethanol does not exceed 20 percent. It is a disadvantage of this method that 2-mercaptoethanol is obtained in only low concentration and thus a high expenditure for distillation is required to return the large amounts of bis-(β-hydroxyethyl) thioether to the reaction. Moreover it is disclosed in Japanese Pat. publication No. 19,783/1964 that 2-mercaptoethanol is obtained when hydrogen sulfide is dissolved in bis-(β-hydroxyethyl) thioether and then reacted at 63°C at a pressure of 24 atmospheres with ethylene oxide, the pressure constantly decreasing due to the consumption of starting material. The reaction proceeds fairly slowly (as may be seen from the amounts of ethylene oxide added) and is therefore not suitable for industrial manufacture. Moreover large amounts (for example 71.9 percent by weight) of β-hydroxyethyl thioether (with reference to the whole of the reaction mixture) are used and have to be recovered. Finally it is known from Japanese Pat. publication No. 10,122/1965 that 2-mercaptoethanol is obtained when ethylene oxide is dissolved in bis-(β-hydroxyethyl) thioether and the mixture is allowed to react for some time and then reacted with hydrogen sulfide. The method has the disadvantage that the reaction of ethylene oxide with bis-(β-hydroxyethyl) thioether readily proceeds in an uncontrollable manner and this is undesirable.

It is an object of this invention to provide a process in which it is not necessary to return large amounts of excess hydrogen sulfide. Another object of the invention is to provide a process in which the amount of bis-(β-hydroxyethyl) thioether to be returned is much less than hitherto. It is a further object of the invention to provide a process in which polyethers are not formed. Finally it is an object of the invention to provide a process which gives good yields.

In accordance with this invention these and other objects and advantages are achieved in an improved process for the production of 2-mercaptoethanol by reaction of ethylene oxide with hydrogen sulfide in a molar ratio of about 1:1 in the presence of bis-(β-hydroxyethyl) thioether as solvent at elevated temperature and superatmospheric pressure in which the improvement consists in carrying out the reaction in a homogeneous phase.

Ethylene oxide and hydrogen sulfide are used in a molar ratio of about 1:1. A slight excess of hydrogen sulfide, for example of 0.1 mole, is not disadvantageous.

Bis-(β-hydroxyethyl) thioether is used as solvent. It is advantageous to use such an amount of the said thioether that it is 22 to 30 percent by weight with reference to the whole of the reaction mixture.

It is advantageous to carry out the reaction at temperatures of from 20° to 110°C. Particularly good results are obtained by using temperatures of 50° to 80°C. It is preferable to use pressures of 25 to 90 atmospheres in the reaction.

It is an essential feature of the invention that the reaction is carried out in homogeneous phase, i.e., that no gas phase forms in the reaction zone. To achieve this, the pressure used at the given temperature has to be chosen in each case so that it is higher than the vapor pressure of the hydrogen sulfide. In this way it is ensured that a homogeneous phase is maintained during the reaction.

It is advantageous to correlate throughput and size of reaction zone so that reaction periods of 1.5 to 5 minutes are maintained.

The process according to the invention may for example be carried out by passing bis-(β-hydroxyethyl) thioether, ethylene oxide and hydrogen sulfide in the specified ratio upwards into a tubular reaction zone, efficient mixing being ensured at the start of the reaction zone by baffles and the reaction being carried out at the specified pressures and temperatures. Tubular reaction zones having a length:diameter ratio of 5,000:1 to 10,000:1 have proved to be particularly suitable. Pressure and temperature are correlated so that no gas phase forms in the reaction zone. The reaction mixture is expanded at the upper portion of the reaction zone and worked up by fractional distillation. The bis-(β-hydroxyethyl) thioether used as solvent is recycled to the reaction.

The 2-mercaptoethanol prepared by the process of the invention is suitable for the production of insecticides.

The following example illustrates the invention.

EXAMPLE

In each hour 27.3 kg of a mixture of 50.5 percent by weight of hydrogen sulfide and 49.5 percent by weight of bis-(β-hydroxyethyl) thioether are metered together with 17.6 kg of ethylene oxide into a tubular coil consisting of 11 successive tubes in hairpin arrangement each tube having a length of 6 meters and an internal diameter of 7 mm and having a total volume of 2,545 ccm. The concentration of the bis-(β-hydroxyethyl) thioether in the mixture is 30 percent by weight. The mixture of bis-(β-hydroxyethyl) thioether and hydrogen sulfide and the ethylene oxide are separately heated to 80°C in separate heat exchangers prior to being mixed. The feed is through a baffle zone in which mixing is effected. A temperature of 80°C is maintained in the coiled tube throughout the whole of the reaction zone by cooling zones. The pressure is controlled by a relief valve at the end of the coiled tube at 75 atmospheres gauge. 44 kg per hour of a reaction mixture is obtained at the end of the coiled tube; it consists of 62.2 percent by weight of 2-mercaptoethanol and 37.8 percent by weight of bis-(β-hydroxyethyl) thioether (or 90 percent of mercaptoethanol and 10 percent of thiodiglycol after deducting the amount of thiodiglycol introduced) and 27.3 kg of 2-mercaptoethanol having a boiling point of 157°C is obtained per hour by fractional distillation. The residence period in the coiled tube is 3.2 minutes.

We claim:

1. An improved process for the production of 2-mercaptoethanol by reaction of ethylene oxide with hydrogen sulfide in a molar ratio of about 1:1 in the presence of 22 to 30 percent by weight of bis-(β-hydroxyethyl) thioether with reference to the whole of the reaction mixture as a solvent at a temperature of from 20° to 110°C and a pressure of from 25 to 90 atmospheres, wherein the improvement consists in carrying out the reaction in a homogeneous liquid phase, the pressure at the reaction temperature within said temperature range being higher than the vapor pressure of the hydrogen sulfide to thereby avoid formation of a gas phase in the reaction mixture, the molar ratio of ethylene oxide to hydrogen sulfide in the reaction mixture being about 1:1.

2. A process as claimed in claim 1 carried out at a temperature of from 50° to 80°C.

3. A process as claimed in claim 1 carried out for reaction periods of 1.5 to 5 minutes.

4. A process as claimed in claim 1 carried out in a reaction zone having a length:diameter ratio of from 5,000:1 to 10,000:1.

* * * * *